United States Patent
Simon Bacardit

[19]

[11] Patent Number: 5,941,071
[45] Date of Patent: Aug. 24, 1999

[54] BOOSTED BRAKING DEVICE WITH HYDRAULIC REACTION AND IMPROVED SAFETY

[75] Inventor: Juan Simon Bacardit, Drancy, France

[73] Assignee: Robert Bosch Technology Corp, Broadview, Ill.

[21] Appl. No.: 08/860,692

[22] PCT Filed: Jun. 4, 1997

[86] PCT No.: PCT/FR97/00986

§ 371 Date: Jun. 11, 1997

§ 102(e) Date: Jun. 11, 1997

[87] PCT Pub. No.: WO98/06613

PCT Pub. Date: Feb. 19, 1998

[30] Foreign Application Priority Data

Aug. 9, 1996 [FR] France ................................. 9610188

[51] Int. Cl.$^6$ ............................................. B60T 13/20
[52] U.S. Cl. .............................. 60/553; 60/554; 60/562; 60/582
[58] Field of Search ........................... 60/552, 553, 554, 60/562, 582

[56] References Cited

U.S. PATENT DOCUMENTS

| | | | |
|---|---|---|---|
| 3,109,287 | 11/1963 | Gardner | 60/562 |
| 3,470,695 | 10/1969 | Kilb | 60/553 |
| 3,473,329 | 10/1969 | Eggstein | 60/562 |
| 4,693,083 | 9/1987 | Reinartz | 60/554 |
| 5,154,056 | 10/1992 | Gautier et al. | 60/547.1 |

*Primary Examiner*—F. Daniel Lopez
*Attorney, Agent, or Firm*—Leo H McCormick, Jr.; Warren Comstock

[57] ABSTRACT

A boosted braking device for a motor vehicle having a master cylinder (200) and a pneumatic booster (100). The master cylinder (200) is equipped with a primary piston (30) which receives an actuating force to increase pressure in a primary hydraulic circuit (I) which increases an increase in pressure in a secondary hydraulic circuit (II) and a secondary piston (31) which is subjected to the hydraulic pressure in the primary circuit (I). The pneumatic booster (100) is controlled by the application of an input force through which an actuation force is applied to the primary piston (30). The primary piston (30) has a hollow cylinder (200) the interior of which is in communication with the primary hydraulic circuit (I). A reaction piston (34) which slides in a leaktigth fashion inside of the hollow cylinder (200) urged toward the master cylinder by a first elastic force provided by a first elastic member (46). The hollow cylinder (32) has at least one opening (36) through which the interior thereof is in communication with the inside of the master cylinder (200). The hollow cylinder (32) includes a reaction piece (76) against which an end part (58) of the reaction piston (34) abuts to exert a force proportional to a force caused by the hydraulic pressure in the secondary circuit (II) exerted on the secondary piston (31) in the event of a failure of the primary hydraulic circuit(I).

9 Claims, 1 Drawing Sheet

BOOSTED BRAKING DEVICE WITH HYDRAULIC REACTION AND IMPROVED SAFETY

The present invention relates to boosted braking devices for motor vehicles, comprising a master cylinder controlling the hydraulic pressure in the brake circuit connected to the brakes of the vehicle it being possible for this master cylinder to be actuated by a pneumatic booster when the driver of the vehicle depresses the brake pedal.

BACKGROUND OF THE INVENTION

In the conventional way, the master cylinder is full of brake fluid and equiped with a primary piston intended to receive an actuating force composed of an input force and of a boost force both acting in an axial direction, so as to cause an increase in pressure in a primary hydraulic circuit, and with a secondary hydraulic piston subjected to the hydraulic pressure in the primary hydraulic circuit and causing an increase in pressure in a secondary hydraulic circuit.

Also, in the conventional way, the pneumatic booster can be controlled by the application of the input force to a control rod controlling the opening of a valve in order to exert the actuating force on the primary piston of the master cylinder, the booster including a rigid casing divided in leaktight fashion into two chambers by means of a moving partition which can be acted upon by a difference in pressure between the two chambers resulting from the opening of the valve and can drive a pneumatic piston, which can move with respect to the casing, carrying the valve, the input force being transmitted via a reaction disc against which the pneumatic piston also rests in order to impart at least some of the boost force to it.

A device of this type is well known in the prior art and is described, for example, in document U.S. Pat. No. 4,491,058.

In parallel, boosted braking devices have been developed in which the reaction exerted on the control rod is not supplied mechanically by a reaction disc, but by the hydraulic pressure prevailing in the master cylinder.

In these devices, she main hydraulic piston of the master cylinder itself includes a hollow moving cylinder communicating with the master cylinder and receiving at least some of the boost force, and inside which there slides, in leaktight fashion and in the axial direction, a secondary hydraulic piston which can receive at least the input force, elastic means exerting an elastic force between the secondary hydraulic piston and the moving cylinder and urging the secondary hydraulic piston towards the master cylinder, at least one opening being made in the moving cylinder to make the inside of the latter communicate with the inside of the master cylinder.

Such a device is described, for example, in document FR-A-2,658,466.

These devices with hydraulic reaction have the main advantage that irrespective of the intensity of the braking action or the rate of application of the input force, their characteristic operating curve, namely the curve giving the pressure in the master cylinder as a function of the intensity of the input force on the booster, is unchanged.

However, in the event of failure in the hydraulic circuit between the master cylinder and the wheel brakes, the pressure inside the primary or secondary hydraulic circuit cannot be established. In both cases this results in an increase in the travel of the brake pedal in order to obtain an increase in the hydraulic pressure in the intact circuit. However, if this failure affects the primary hydraulic circuit, this additionally results in a complete loss of reaction felt by the driver on the brake pedal, which means that he can no longer gauge the braking force except by gauging the travel of the brake pedal, which travel is itself already disturbed.

Attempts have already been made to solve this problem, for example in documents FR-A-1,475,049 or U.S. Pat. No. 3,470,695. These documents envisage the use of the hydraulic pressure in the secondary circuit, assumed to be intact, to provide the desired reaction on the brake pedal. Aside from the fact that they result in complicated embodiments, they require the presence of a third piston sliding in leaktight fashion in the secondary piston. Such an arrangement is prohibited by current legislation, because it introduces a risk of leakage between the primary and secondary circuits, which would not be detectable under normal operating conditions, that is to say unless there were a failure, which conditions are usually satisfied. In addition, the boosted braking systems in these documents do not display the characteristic of a "jump" at the beginning of a braking action, which characteristic is now required by motor vehicle manufacturers to improve the feel experienced by the driver when he actuates the brake device.

The present invention falls within this context and its object is to propose a boosted braking device with hydraulic reaction, which makes the driver, under all operating circumstances, feel a reaction on the brake pedal even in the event of failure of the primary hydraulic circuit, without requiring a complicated device, and which is therefore of low cost while having an operation which is reliable under all circumstances, the leaktightness between the primary and secondary circuits complying with legislation.

To this end, the present invention proposes a boosted braking device for a motor vehicle, comprising on the one hand a master cylinder full of brake fluid and equipped with a primary piston intended to receive an actuating force composed of an input force and of a boost force both acting in an axial direction, so as to cause an increase in pressure in a primary hydraulic circuit, and with a secondary hydraulic piston subjected to the hydraulic pressure in the primary hydraulic circuit and causing an increase in pressure in a secondary hydraulic circuit, and on the other hand a pneumatic booster which can be controlled by the application of the input force to a control rod integral with a plunger controlling the opening of a three-way valve in order to exert the actuating force on the primary piston, the booster including a rigid casing divided in leaktight fashion into at least two chambers by means of at least one moving partition which can be acted upon by a difference in pressure between the two chambers resulting from the opening of the three-way valve and can drive a pneumatic piston, which can move with respect to the casing, carrying the three-way valve and contributing at least to transmitting the boost force, the primary piston of the master cylinder itself including a hollow moving cylinder communicating with the primary hydraulic circuit of the master cylinder, receiving at least some of the boost force, and inside which there slides, in leaktight fashion and in the axial direction, a reaction piston which can receive at least the input force, first elastic means exerting a first elastic force between the reaction piston and the moving cylinder and urging the reaction piston towards the master cylinder, at least one opening being made in the moving cylinder to make the inside of the latter communicate with the primary hydraulic circuit.

Such a boosted braking device is known, for example, from document EP-B-0,662,894.

SUMMARY OF THE INVENTION

According to the present invention, the moving cylinder includes a reaction piece against which an end part of the reaction piston can abut in order thereon to exert a force proportional to the force caused by the hydraulic pressure in the secondary hydraulic circuit exerted on the secondary piston in the event of failure of the primary hydraulic circuit.

Further objects, features and advantages of the invention will emerge clearly from the description which follows of one embodiment given by way of non-limiting example with reference to the appended drawings.

DETAILED DESCRIPTION OF THE DRAWINGS

Figure 1:
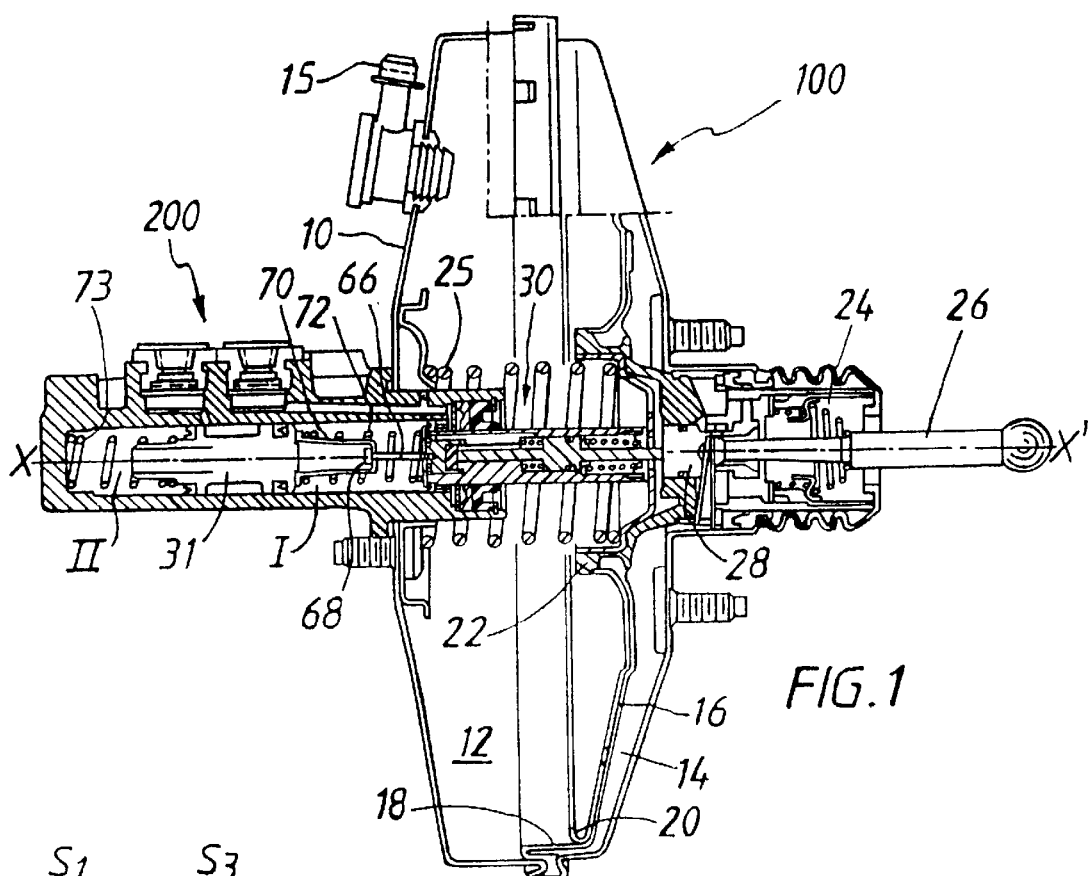
FIG. 1 represents a view in section of a boosted braking device produced in accordance with the present invention.

Insofar as the invention relates only to an improvement made to pneumatically boosted braking systems, and as the overall construction and operation of such systems are well known to those skilled in the art, these systems will be summarized rapidly here merely to give a complete understanding of the improvement that the invention represents.

Schematically, a system of this type comprises a booster 100 and a master cylinder 200.

The booster 100 is designed to be fixed in the customary fashion on a bulkhead (not represented) separating the engine bay of a vehicle from the passenger compartment of this vehicle and to be actuated by a brake pedal (not represented) situated in this passenger compartment. The master cylinder 200 controlling the hydraulic braking circuit of the vehicle is fixed on the front wall of the booster 100.

By convention, the part of the booster/master cylinder assembly which points towards the master cylinder 200 is called the "front", and that part of this assembly which points towards the brake pedal 12 is called the "rear". In the figures, the front is therefore to the left and the rear to the right.

The booster 100 itself includes a rigid casing 10, the interior volume of which is divided into a front chamber 12 and a rear chamber 14, in leaktight fashion, by a moving partition 16 comprising a membrane 18 and a rigid skirt 20 and driving a pneumatic piston 22 which can move inside the casing 10.

The front chamber 12, the front face of which is closed in leaktight fashion by the master cylinder 200 is permanently connected to a source of partial vacuum (not represented) through a connection 15. The pressure in the rear chamber 14 is controlled by a three-way valve 24 controlled by a control rod 26 connected to the brake pedal and integral with a plunger 28.

When the control rod 26 is in the position of rest, that is to say pulled towards the right, the valve 24 establishes a communication between the two chambers 12 and 14 of the booster. As the rear chamber 14 is then subjected to the same partial vacuum as the front chamber 12, the piston 22 is pushed back towards the right, in the position of rest, by a spring 25.

Actuating the control rod 26 towards the left has the effect, first of all, of shifting the valve 24 so that it isolates the chambers 12 and 14 from one another, and then, secondly, of shifting this valve in such a way that it opens the rear chamber 14 to atmospheric pressure.

The difference in pressure between the two chambers 12 and 14, which is now felt by the membrane 18, exerts on the moving partition 16 a thrust which tends to shift it to the left and allow it to drive the piston 22, which in turn shifts, compressing the spring 25.

The braking force exerted on the control rod 26, or "input force", and the brake boosting force, or "boost force", resulting from the thrust of the moving partition 16 are then applied together in the direction of the axis X–X' of the booster 100 in the direction of the master cylinder 200, and combine to constitute the actuating force thereon.

More specifically, the actuating force is applied to the primary piston 30 of the master cylinder and causes it to shift to the left (in the figures), which leads to a rise in pressure of the brake fluid present in the primary circuit I of the master cylinder 200 and an actuation of the brake (not represented) connected thereto. The pressure in the primary circuit I in turn urges the secondary piston 31 of the master cylinder towards the left, which leads to a rise in pressure of the brake fluid present in the secondary circuit II of the master cylinder and an actuation of the brake connected thereto.

Figure 2:
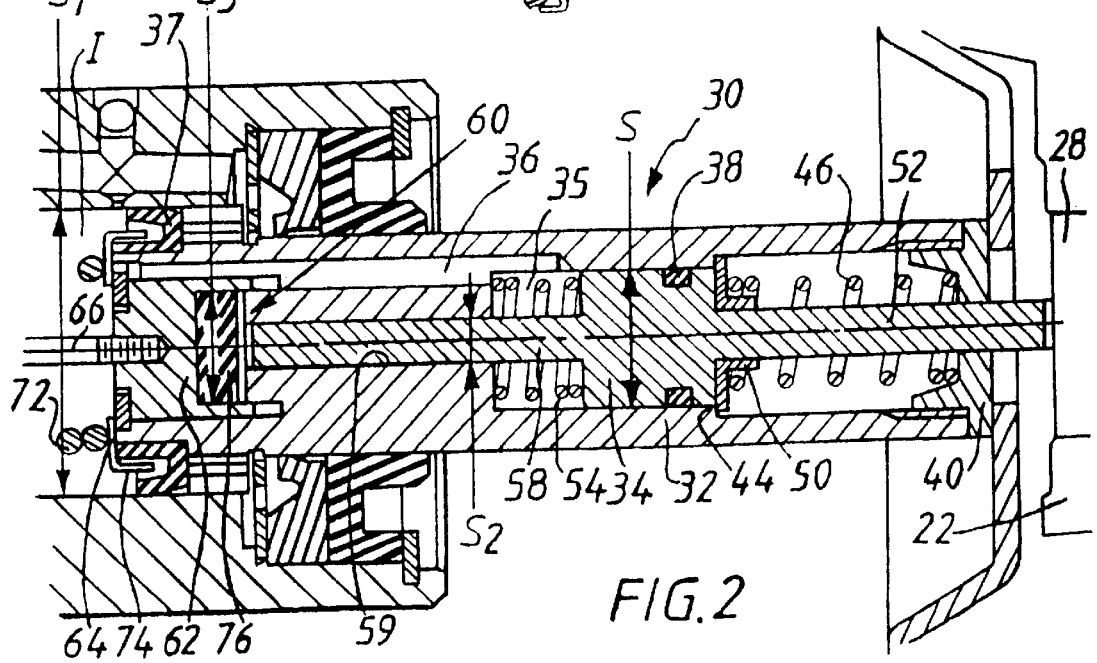
FIG. 2 represents a view in section on an enlarged scale of the central part of the device of FIG. 1.

As seen more clearly in FIG. 2, the primary piston 30 is in fact composite and comprises on the one hand a moving and hollow cylinder 32, and on the other hand a reaction piston 34.

The interior volume 35 of the hollow moving cylinder 32 communicates with the interior volume I of the primary circuit of the master cylinder via openings, such as 36, made in the moving cylinder in an axial direction.

Aside from the passage of fluid permitted by these openings 36 between the interior volume I of the primary circuit of the master cylinder 200 and the interior volume 36 of the moving cylinder 32, this moving cylinder 32 slides in leaktight fashion in the body of the master cylinder 200, leaktightness being obtained by means of at least one annular lip seal 37.

For its part, the reaction piston 34 slides inside the moving cylinder 32 which it closes in leaktight fashion by means of an annular seal 38.

The moving cylinder 32 is connected, via a ring 40, to the rigid skirt 20 in such a way as to receive at least some of the boost force exerted by this rigid skirt 20.

The reaction piston 34 is arranged axially facing the plunger 28 capable of transmitting to it at least the input force exerted on the control rod 26 which is itself integral with the plunger 28.

The operation of the device described hitherto will now be explained.

At rest, the various moving parts occupy the position represented in FIGS. 1 and 2, and in particular, the reaction piston 34 is in abutment towards the front on a radial shoulder 44 of the moving cylinder 32 under the effect of the action of a spring 46. The valve 24 allows communication between the two chambers 12 and 14, which are therefore at the same reduced pressure provided by the connection 15.

An initial force on the brake pedal serves to overcome the preload of the spring of the control rod 26 and to bring the valve 24 into a position in which it isolates the two chambers 12 and 14 from one another. This increase in force on the brake pedal therefore provides no increase in pressure in the master cylinder.

After the control rod 26 has covered this predetermined distance, the valve 24 opens the rear chamber 14 of the booster 100 to the atmosphere, and a pressure difference is set up between the two chambers 12 and 14 of the booster. This pressure difference causes a boost force which makes the rigid skirt 20 and the moving cylinder 32 advance.

The hydraulic pressure in the primary circuit I of the master cylinder 200 then rises and, by the flow of hydraulic fluid through the openings 36, becomes established in the internal volume 35 of the moving cylinder 32 and is exerted on the cross-sectional area S of the reaction piston 34.

First of all, the force caused by this pressure exerted on this cross-sectional area S does not exceed the preload of the spring 46 at rest, so that the reaction piston 34 remains immobile with respect to the moving cylinder 32, and some distance from the thrust rod 42, no reaction then being felt on the brake pedal.

Next, the hydraulic pressure in the volumes I and 35 rises and reaches a predetermined value at which, when applied to the cross-sectional area S, it becomes sufficient to overcome the preload of the spring 46 at rest. The reaction piston 34 then shifts backwards and comes into contact with the plunger 28. A buffer piece made of rubber or some other elastomeric material may advantageously be provided at the rear of the reaction piston 34 and/or at the front of the plunger 28 in order to deaden the impact of this contact and the resulting noise.

This first phase of operation is known as the booster "jump".

The booster lump may be set to any desired value by adjusting the preload of the spring 46 at rest. For example, as represented in FIGS. 1 and 2, provision may be made for the ring 40 to be threaded and screwed into the moving cylinder 32 to which it transmits at least some of the boost force exerted on the skirt 20 bearing against it.

Screwing the ring 40 into the moving cylinder 32 thus has the effect of compressing the spring 46 and therefore of increasing the preload the latter exerts on the reaction piston 34 in the direction of the master cylinder, that is to say of further increasing the jump.

In order to compensate for the reduction in length which results from screwing the ring 40 into the moving cylinder 32, this ring is, for example, made as two parts screwed together so as to have an adjustable overall length.

It is also possible to envisage producing the thrust rod 42 itself as two parts screwed together so as to have an adjustable overall length, the adjusting of this length especially making it possible to alter the opening of the valve when the jump occurs, irrespective of the value given to this jump by the screwing of the ring 40 into the moving cylinder 32.

Following this jump phenomenon, the reaction piston 34 exerts on the plunger 28, and therefore on the brake pedal, a reaction force which depends on the boost force, opposing the input force and therefore allowing the first force to be controlled by the second. The reaction piston 34 is therefore subjected to the hydraulic pressure prevailing in the reaction chamber consisting of the interior volume 35 of the moving cylinder 32.

The boost ratio of the braking device is equal to the ratio of the cross-sectional area $S_1$ of the moving cylinder 32 to the cross-sectional area S of the reaction piston 34.

The boost force reaches its maximum when the pressure in the rear chamber of the booster reaches atmospheric pressure, and can therefore increase no further. The phenomenon known by the name of "saturation" is then reached.

During all these phases of the operation, it may be seen that the hydraulic pressure thus caused in the primary circuit I is exerted on the secondary piston 31 which in turn causes a rise in hydraulic pressure in the secondary circuit.

If the latter circuit should become defective, then the secondary piston 31 can no longer pressurize it and comes into abutment at the end of the master cylinder, the primary piston 30 continuing to cause a rise in pressure in the primary circuit as was explained earlier, at the expense of a lengthening of the travel of the control rod 26 and of the brake pedal. Naturally, an acoustic and/or visual alarm on the dashboard will have alerted the driver to the failure of the brake circuit so that he will not be taken too much by surprise by this lengthened travel.

By contrast, should be primary circuit become defective, the primary piston comes into abutment against the secondary piston and this then causes a rise in pressure in the secondary circuit, with a corresponding lengthening of the travel of the control rod 26 and of the brake pedal. In the latter case, as the pressure in the primary circuit cannot rise, the reaction piston 34 exerts no force on the plunger 28, so the driver feels no resistive force on the brake pedal, the travel of which has lengthened, and he experiences great difficulty in gauging his braking action under such condition.

The present invention makes it possible to achieve this result, that is to say to obtain braking in the event of failure of the primary circuit, while providing the driver with reaction allowing him optimum control of braking under these impaired conditions.

In accordance with the present invention, and as seen more clearly in FIG. 2, the reaction piston 34 is itself composite. It includes a first part 50 in abutment, in the position of rest, on the moving cylinder 32 under the effect of the action of the spring 46. It also includes a second part 52 which can slide inside the first part 50.

The second part 52 is in abutment towards the rear, in the position of rest, on the first part 50 under the effect of the action of a second spring 54 arranged between shoulders on the moving cylinder 32 and on this second part 52. The second spring 54 has a preload at rest which is less than that of the spring 46.

The second part 52 slides in leaktight fashion in the moving cylinder 32 by means of an annular seal 38, as was described earlier. The second part 52 is formed at its front end with an axial extension 58 sliding with clearance in an axial bore 59 of the moving cylinder 32, and with cross-sectional area $S_2$. It is possible, for example, to envisage forming the axial extension 58 and/or the bore (59) with axial grooves or slots, allowing unrestricted communication between the housing 60 and the reaction chamber 35.

The front end of the moving cylinder 32 is formed with a housing 60 in which an intermediate piece 62 is held axially captive, for example using a circlip 64. The intermediate piece 62 is integral, for example by screwing, with a rod 66 extending forwards, the front end of the rod 66 being formed with a head 68 (FIG. 1) held captive in a spring plate 70 held away from the primary piston by a compression spring 72.

The rod 66 and the spring plate 70 thus determine the maximum length of the spring 72, and also the maximum separation between the primary piston 30 and the secondary piston 31, a spring 73 being arranged between the bottom of the master cylinder and the secondary piston 31 in order to urge the latter against the spring plate 70, the spring rate of the spring 72 being greater than that of the spring 73.

The effect of the spring 72 is also to urge the intermediate piece 62 forwards, into abutment against the circlip 64. As has been represented, it can advantageously be contrived for the circlip 64 to be held in place by the spring 72 itself, or by means of a washer 74 which also plays a part in retaining the seal 37.

The intermediate piece 62 is formed on its rear face with a cylindrical axial housing in which there is arranged a disc 76 made of rubber or some other elastomeric material, of cross-sectional area $S_3$.

The way in which the boosted braking device according to the invention operates will be readily understood from the foregoing explanations. During braking under normal conditions, that is to say with no failure, the pressure prevailing in the interior volume I of the primary circuit of the master cylinder is communicated to the reaction chamber 35 through the opening 36 so that it can be exerted on the cross-sectional area S of the second part 52 of the reaction piston, and cause it to retreat at the same time as the first part 50, thus giving the desired reaction on the plunger 28 and therefore on the control rod 26 and the brake pedal.

If the secondary circuit II becomes defective, then the secondary piston 31 can no longer pressurize this circuit II and comes into abutment against the end of the master cylinder. The primary piston 30 continues to cause a rise in pressure in the primary circuit I, the pressure present in this circuit acting on the cross-sectional area S of the reaction piston as was explained earlier. Thus braking is still achieved with just the primary circuit I, the travel of the control rod 26 and of the brake pedal being lengthened by the travel required for the secondary piston to come into abutment on the end of the master cylinder, this braking being carried out by the driver against a reaction force proportional to the intensity of the braking.

If the primary circuit I is defective, then no rise in pressure can occur upon a braking action. When the driver depresses the brake pedal, the plunger 28 actuates the valve 24 which places the rear chamber 14 of the booster in communication with the atmosphere. The moving partition 16, subjected to a difference in pressure, therefore advances towards the master cylinder, driving the moving cylinder 32 along with it.

This moving cylinder enters the master cylinder without encountering any resistance because the pressure in the primary circuit I cannot rise. The phenomenon of jump explained earlier cannot therefore occur, so that the plunger 28 does not encounter any resistance either, and in turn advances with respect to the pneumatic piston 22. In this movement, the plunger 28 comes into abutment on the second part 52 of the reaction piston, which it causes to slide forwards with respect to the first part 50 until the axial extension 58 in turn comes into abutment against the disc 76, against the action of the spring 54.

At the same time, in the forward movement of the primary piston 30, the rod 66 enters the spring plate 70 of the secondary piston 31, the secondary circuit, assumed to be free of failure, offering resistance against the advancement of this secondary piston.

The forward movement of the primary piston 30 continues until the rod 66 has completely entered the spring plate 70, that is to say until the front face of the intermediate part 62 comes into contact with the rear end of the spring plate 70. At this instant, on the one hand, the secondary piston 31 is urged forwards and causes a rise in pressure in the secondary circuit II and on the other hand the rear end of the spring plate 70, in abutment against the intermediate piece 62, makes the latter retreat into its housing 60 until the rear face of the disc 76 comes into contact with the front face of the housing 60, or more exactly with the annular part of this front face around the axial bore 59, causing the axial extension 58 and therefore the reaction piston to retreat.

This is thus a situation similar to that of a booster with mechanical reaction provided by a reaction disc. In effect, the input force exerted on the control rod 26 is transmitted by the plunger 28 to the second part 52 of the reaction piston and is exerted by the axial extension 58 on the cross-sectional area $S_2$ of the disc 76. The boost force exerted by the moving partition is transmitted by the moving cylinder 32 to the annular cross-sectional area $S_3-S_2$ of the disc 76. For its part, the disc 76 is subjected to the force caused by the pressure prevailing in the secondary circuit II, exerted on the secondary piston 31 and transmitted via the spring plate 70.

In these conditions of failure of the primary circuit I, it can thus clearly be seen that the driver obtains braking using just the secondary circuit II, the travel of the control rod 26 and of the brake pedal being lengthened by the travel required for the primary piston to come into abutment on the spring plate 70 of the secondary piston 31, this braking being carried out by the driver against a reaction force proportional to the pressure prevailing in the secondary circuit II, with a boost ratio equal to the ratio of the annular cross-sectional area $S_3$ of the moving cylinder 32 to the cross-sectional area $S_2$ of the reaction piston in abutment against the plunger 28.

This second boost ratio can be chosen at will, and it may be given any desired value less than, equal to, or greater than the boost ratio obtained when there is no fail re. The second boost ratio will preferably be chosen to be greater than the boost ratio obtained when there is no failure, in order to give the driver further assistance in this failure situation, in which he has no braking other than from the secondary hydraulic circuit, and therefore, generally speaking, on two wheels instead of four, and so that he has the same feel when he depresses the brake pedal, except for the loss in travel, using just the secondary circuit.

Thus, according to the present invention a boosted braking device with hydraulic reaction has indeed been achieved which exhibits improved operating characteristics in the event of failure of the primary hydraulic circuit because, aside from the lengthened pedal travel, the driver can then gauge his braking effort in the way he customarily does for failure-free braking. The means employed to obtain this result are relatively simple and are therefore of low cost and operate reliably in all circumstances, both under normal operating conditions and in conditions of hydraulic failure, the leaktightness between the primary and secondary circuits complying with the legislation.

I claim:

1. A boosted braking device for a motor vehicle, comprising a master cylinder full of brake fluid and a pneumatic booster, said master cylinder being equipped with a primary piston for receiving an actuating force composed of an input force and of a boost force both acting in an axial direction to cause an increase in pressure in a primary hydraulic circuit and with a secondary hydraulic piston subjected to hydraulic pressure in said primary hydraulic circuit for causing an increase in pressure in a secondary hydraulic circuit, said pneumatic booster being controlled by the application of an input force to a control rod integral with a plunger which controls the opening of a three-way valve and exerts an actuating force on said primary piston, said booster including a rigid casing divided in leaktight fashion into at least first and second chambers by a movable partition, said partition being acted on by a difference in pressure between said first and second chambers resulting from the opening of said three-way valve, said difference in pressure driving a pneumatic piston which carries said three-way valve and moves with respect to said casing and contributing at least to transmitting the boost force, said primary piston including a hollow moving cylinder in communication with said primary hydraulic circuit of the master cylinder and receiving at least some of said boost force, a composite reaction piston having a first part which abuts, in a position of rest, against said moving cylinder under the effect of a first elastic means, and a second part which slides with respect to the first part, said second part being urged in said rest position against said first part by a second elastic means, said reaction piston receiving at least the input force and slides in a leaktight fashion and axial direction in said hollow moving cylinder, said first elastic means in exerting said first elastic force between said reaction piston and said moving cylinder urging said reaction piston towards said master cylinder, said moving cylinder having at least one opening through which the interior thereof is in communication with said primary hydraulic circuit, said moving cylinder having a reaction piece, said reaction piston having an end part which engages said reaction piece to exert a force proportional to a force caused by the hydraulic pressure in the secondary hydraulic circuit exerted on the secondary piston in the event of a failure of the primary hydraulic circuit.

2. A boosted braking device according to claim 1, characterized in that said reaction piece is carried by an intermediate piece of the moving cylinder.

3. A boosted braking device according to claim 2, characterized in that said intermediate piece is held in a housing of the moving cylinder and moves axially in said housing.

4. A boosted braking device according to claim 3, characterized in that said intermediate piece comes into abutment with respect to the secondary piston and retreats into said housing in the event of failure of said primary hydraulic circuit.

5. A boosted braking device according to claim 4, characterized in that an end part of said reaction piston slides in a non-leaktight fashion in a bore of the moving cylinder.

6. A boosted braking device according to claim 5, characterized in that said end part of said reaction piston is formed with axial grooves.

7. A boosted braking device according to claim 5, characterized in that a bore of said moving cylinder is formed with axial grooves.

8. A boosted braking device according claim 5, characterized in that a bore of said moving cylinder extends between a housing of said reaction piece and said interior said moving cylinder.

9. A boosted braking device according to claim 1, characterized in that said reaction piece is a reaction disc.

* * * * *